United States Patent
Murphy (12) 
(10) Patent No.: US 6,411,283 B1
(45) Date of Patent: *Jun. 25, 2002

(54) COMPUTER TOUCH SCREEN ADAPTED TO FACILITATE SELECTION OF FEATURES AT EDGE OF SCREEN

(75) Inventor: Stephen C. Murphy, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/316,077

(22) Filed: May 20, 1999

(51) Int. Cl.[7] .................................................. G09G 5/00
(52) U.S. Cl. ........................ 345/173; 345/901; 345/157; 345/856; 178/18.01
(58) Field of Search .................................. 345/173–183, 345/104, 157, 901, 856–858; 178/18.01, 18.11, 19–19.07; 463/37

(56) References Cited

U.S. PATENT DOCUMENTS

| | | | | |
|---|---|---|---|---|
| 5,119,079 A | * | 6/1992 | Hube et al. ................. | 345/146 |
| 5,177,328 A | * | 1/1993 | Ito et al. ...................... | 178/18 |
| 5,386,219 A | | 1/1995 | Greanias et al. ............. | 345/174 |
| 5,452,414 A | | 9/1995 | Rosendahl et al. ......... | 395/159 |
| 5,510,813 A | | 4/1996 | Makinwa et al. ........... | 345/173 |
| 5,642,490 A | | 6/1997 | Morgan et al. .............. | 395/342 |
| 5,761,681 A | * | 6/1998 | Huffman et al. ............ | 707/500 |
| 5,777,605 A | * | 7/1998 | Yoshinobu et al. ......... | 345/173 |
| 5,821,930 A | * | 10/1998 | Hansen ....................... | 345/340 |
| 5,825,352 A | * | 10/1998 | Bisset et al. ................ | 345/173 |
| 5,854,988 A | | 12/1998 | Davidson et al. ............ | 701/50 |
| 6,040,824 A | * | 3/2000 | Maekawa et al. ........... | 345/173 |
| 6,211,856 B1 | | 4/2001 | Choi et al. .................. | 345/130 |

* cited by examiner

*Primary Examiner*—Lun-Yi Lao
(74) *Attorney, Agent, or Firm*—Dorsey & Whitney LLP (57) ABSTRACT

In one embodiment of the invention, a hot spot is normally centered in an area of contact between a user's finger and a touch screen to position the hot spot on an icon or other feature thereby selecting a program or function corresponding to the icon or feature. When the contact area is near an edge, the hot spot is offset toward the edge so that it coincides more closely to the center of the users finger, thus allowing an icon or other feature adjacent the edge of the screen to be more easily selected. In another embodiment, a cursor is displayed on a touch screen at a location that is offset from the contact area between a finger and the screen. The cursor, which is used as the hot spot of the computer, is normally offset above the contact area except when the contact area is close to the bottom of the screen. The cursor is then offset to the left or right of the contact area depending on whether the contact are is to the left or right of the screen, respectively, so that icons or features adjacent the left or right edges of the screen can be selected. Similarly, when the contact area is very close to the bottom of the screen, the cursor is offset downwardly and to the right or left so that icons or features adjacent the bottom edge of the screen can be selected. Alternatively, a touch sensitive area incapable of displaying an image may be provided beneath a display area of the touch screen to allow icons or features adjacent the bottom edge of the display area to be selected.

8 Claims, 13 Drawing Sheets

COMPUTER TOUCH SCREEN ADAPTED TO FACILITATE SELECTION OF FEATURES AT EDGE OF SCREEN

TECHNICAL FIELD

This invention relates to computer displays, and, more particularly to a touch screen computer display that allows relatively small features displayed on the screen, particularly at the edges of the screen, to be selected more easily.

BACKGROUND OF THE INVENTION

Figure 1:
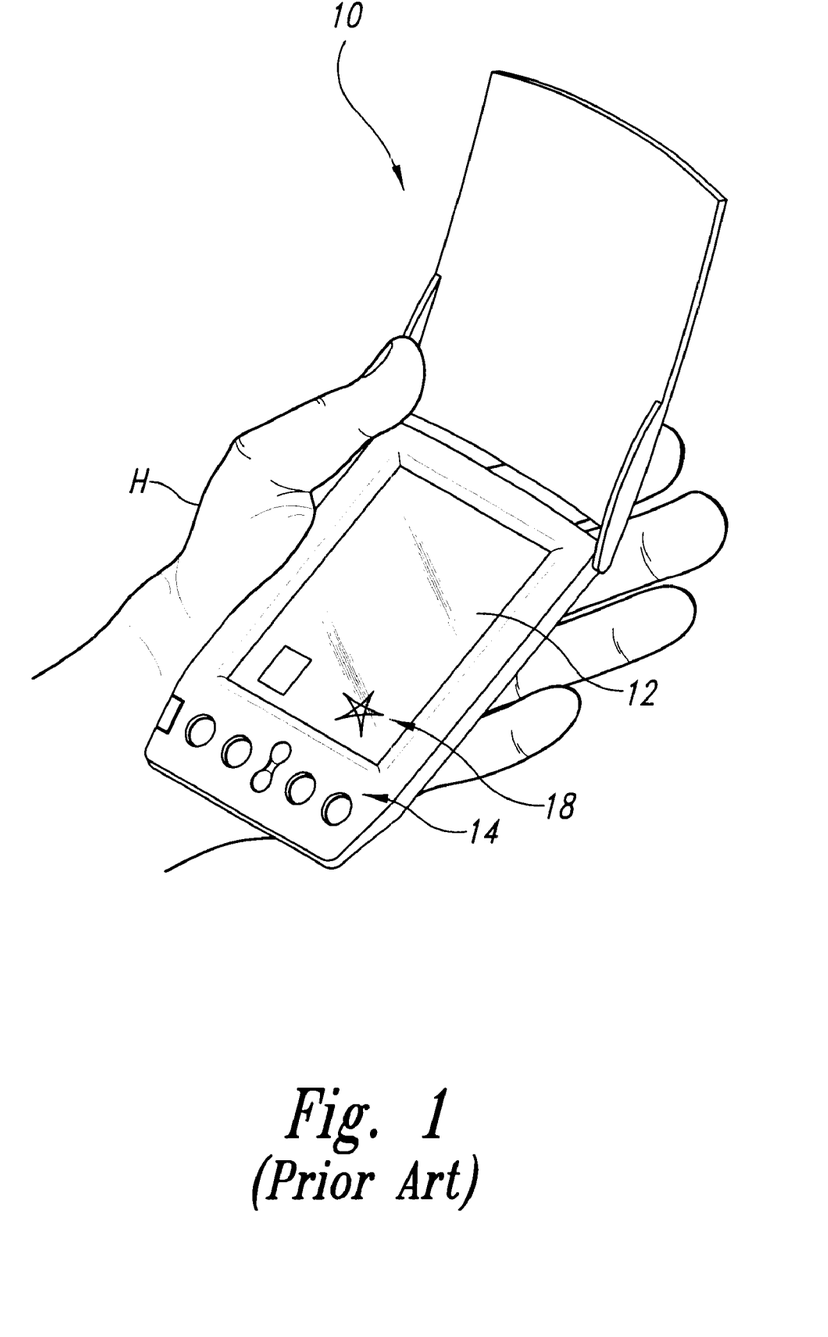
FIG. 1 is an isometric view of a conventional palmtop computer being held by a user of the type that can be operated in accordance with the embodiments of the invention.

FIG. 1 shows a conventional computer 10 of the type that is adapted to be held in the hand H of an operator during use. Such computers 10, known as "palmtop" computers, include a relatively large display screen 12, and a few manually actuated keys, generally indicated as 14. The display screen 12 is preferably a touch screen that primarily controls the operation of the computer 10. More particularly, several icons 18 are displayed on the screen 12, and programs or other functions are selected by touching the screen 12 on the icon 18 corresponding to the program or function to be selected.

Figure 2:
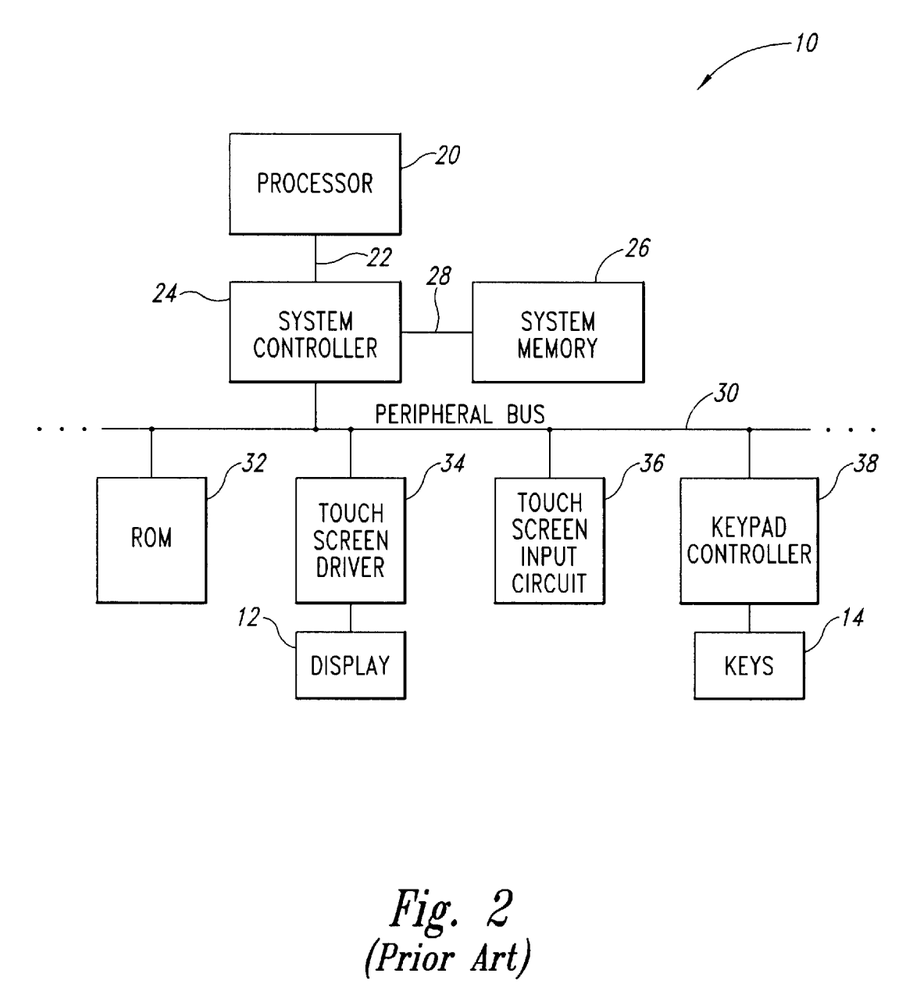
FIG. 2 is a system block diagram of the palmtop computer of FIG. 1.

The basic components of the computer 10 are shown in the system block diagram of FIG. 2. The computer 10 includes a processor 20 of conventional design that is coupled through a processor bus 22 to a system controller 24. The processor bus 22 generally includes a set of bidirectional data bus lines coupling data to and from the processor 20, a set of unidirectional address bus lines coupling addresses from the processor 20, and a set of unidirectional control/status bus lines coupling control signals from the processor 20 and status signals to the processor 20. The system controller 24 performs two basic functions. First, it couples signals between the processor 20 and a system memory 26 via a memory bus 28. The system memory 26 is normally a dynamic random access memory ("DRAM"), but it may also be a static random access memory ("SRAM"). Second, the system controller 24 couples signals between the processor 20 and a peripheral bus 30. The peripheral bus 30 is, in turn, coupled to a read only memory ("ROM") 32, a touch screen driver 34, a touch screen input circuit 36, and a keypad controller 38.

The ROM 32 stores a software program (described below) for controlling the operation of the computer 10, although the program may be transferred from the ROM 32 to the system memory 26 and executed by the processor 20 from the system memory 26. The touch screen driver 34 receives information from the processor 20 and applies appropriate signals to the display 12 through the touch screen driver 34. The touch screen input circuit 36 provides signals indicating that an action has been taken to select a program or function by touching the screen 12 on a corresponding icon 18 (FIG. 1). Finally, the keypad controller 38 interrogates the keys 14 to provide signals to the microprocessor 20 corresponding to a key 14 selected by an operator.

Returning, now, to FIG. 1, most palm computers, such as the computer 10, include a stylus (not shown) adapted to selects the icons 18 displayed on the screen 12. The stylus has a relatively small point thereby allowing icons 18 displayed on the screen 12 to be selected even though the icons 18 may be relatively small and/or positioned close to either other icons 18 or the edges of the screen. However, the use of a stylus can be inconvenient because it is necessary to obtain the stylus, such as by removing it from a receptacle at the back of the computer 10, before any function can be selected.

Figure 3:
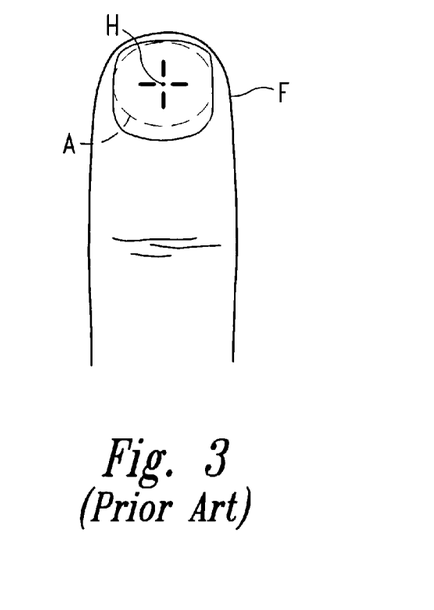
FIG. 3 is a schematic drawing illustrating the manner in which a position of a hot spot is conventionally determined in the palmtop computer of FIG. 1.

To avoid the inconvenience of using a stylus, many operators use their fingers to select icons 18 on the screen 12 of the computer 10. While being more convenient, the use of a finger to select icons 18 creates other problems. Any finger is several orders of magnitude larger than the point of a stylus. It can therefore be difficult to select fine and/or closely spaced icons or features on the screen 12 using a finger. The location on the screen 12 that is selected by a finger is generally a point at the center of the area of the finger that is in contact with the screen. This point is sometimes known as the "hot spot". With reference to FIG. 3, a finger F is shown touching the screen 12. The area A of contact between the finger F and screen 12 is somewhat smaller than the size of the finger F. The computer 10 then calculates a hot spot H at the center of the area of contact A. The hot spot H is small enough to be capable of accurately selecting even the finest and most closely spaced of icons 18 or other features displayed on the screen 12. However, this capability is not realized in practice because the hot spot is not displayed on the screen 12 as a cursor or other indicator. Further, even if a cursor was displayed on the screen 12 to designate the hot spot, the cursor would be beneath the finger F and thus not visible to the operator. Thus, in practice, it is often not possible to select fine and/or closely spaced icons 18 or features on the screen 12 using a finger F.

One approach that has been used to allow icons to be easily selected on touch screens is to display substantially larger icons 18 and features so that there is no ambiguity about which icon 18 or feature is being selected. While this approach does make it easier to select icons and features, it has the disadvantages of requiring that the operation of the computer 10 be altered and reducing the number of icons 18 and features that can be displayed on the screen 12 at the same time.

Figure 4:
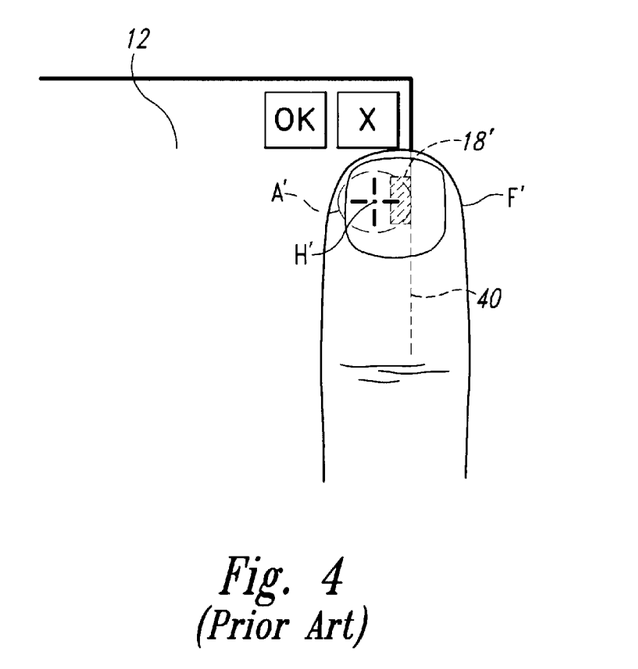
FIG. 4 is a schematic drawing illustrating the manner in which a position of a hot spot is conventionally determined in the palmtop computer of FIG. 1 when attempting to select and icon or other feature that is positioned near the edge of a screen of the computer.

Another limitation of using a finger to select icons 18 and features on computer touch screens 12 is the difficulty of selecting icons or features that are near the edges of the screen 12. With reference to FIG. 4, a finger F' is attempting to select an icon 18' that is adjacent to one edge 40 of the screen 12. The finger F' is centered over the icon 18', but is overlapping the edge 40 of the screen 12. As a result, the area of contact A' between the finger F' and the screen 12 is offset to the left of the center of the finger F' and so is the hot spot H'. Therefore, even though the user has centered his or her finger F' over the icon 18', the hot spot H' is offset from the icon 18'. For this reason, a program or function corresponding to the icon 18' will not be selected. This problem may continue even if the finger F' is moved further to the right of its position shown in FIG. 4 because the hot spot H' will always be located midway between the left edge of the area A' of contact between the finger F' and the screen 12 and the edge 40 of the screen 12. As a result, it may not be possible to position the hot spot H' at or very close to the edge 40 of the screen 12. While the problem is shown in FIG. 4 in the context of selecting an icon 18' adjacent the right edge 40 of the screen 12, it will be understood that the same problem occurs when selecting an icon that is positioned adjacent the left edge, the top edge, the bottom edge, or a corner of the screen 12.

While the foregoing discussion has centered around the problem of selecting icons and features on a touch screen displays for palmtop computers like the computer 10 shown in FIG. 1, the problem may also exist to some extent with selecting icons and features on full size touch screen computer displays.

There is therefore a need for a computer touch screen that allows a finger to accurately select icons and other features even where the icons or features are small and closely spaced, and even where they are at or very close to the edges of the screen.

SUMMARY OF THE INVENTION

A touch screen facilitating the use of touch screen alters the operation of the touch screen when an area of contact is within a predetermined distance of an edge of the touch screen. The position of the contact area on the touch screen is first determined. If the contact area is at a first location on the touch screen, such as within a predetermined distance of an edge of the screen, a user input is registered at a first position relative to the contact area. Otherwise, user input is registered at a second position relative to the contact area. The first position is preferably offset from the second position toward an edge adjacent the contact area. The registered user input may be, for example, a hot spot positioned within the contact area or a cursor displayed at a location offset from the contact area. The operation of the touch screen is preferably altered adjacent the bottom edge of the screen. The user input may be registered at a location offset to either side of the contact area. Alternatively, the touch sensitive portion of the screen may be extended beneath a display area of the screen so that a user input may be registered adjacent the bottom edge of the display area by a contact area positioned below the lower edge of the display area.

DETAILED DESCRIPTION OF THE INVENTION

Figure 5A:
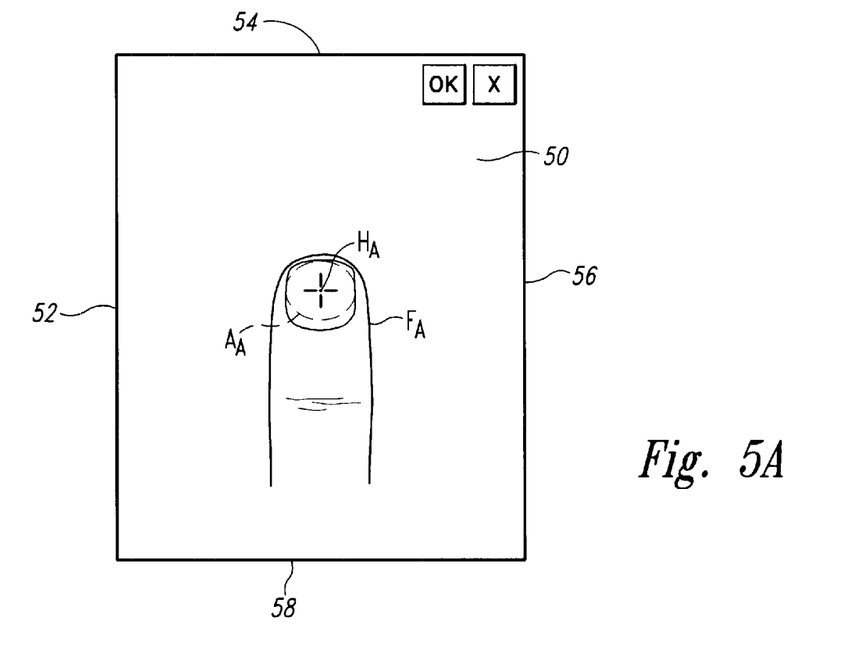
FIGS. 5A–5F are schematic drawings illustrating the operation of an improved palmtop computer in accordance with one embodiment of the invention.

The operation of one embodiment of an improved computer touch screen according to the invention is illustrated in FIGS. 5A–5F. As shown in FIG. 5A, a touch screen 50 has a left edge 52, a top edge 54, a right edge 56, and a bottom edge 58. A finger $F_A$ is in contact with the screen 50 over an area $A_A$. As in the conventional display 12 shown in FIG. 4, the computer 10 calculates a hot spot H (FIG. 3), $H_A$ (FIG. 5A) at the center of the area of contact A (FIG. 3), $A_A$ (FIG. 5A). Icons and features positioned at the hot spot $H_A$ are selected in the same manner as with the conventional computer touch screen 12 explained above.

Figure 5B:
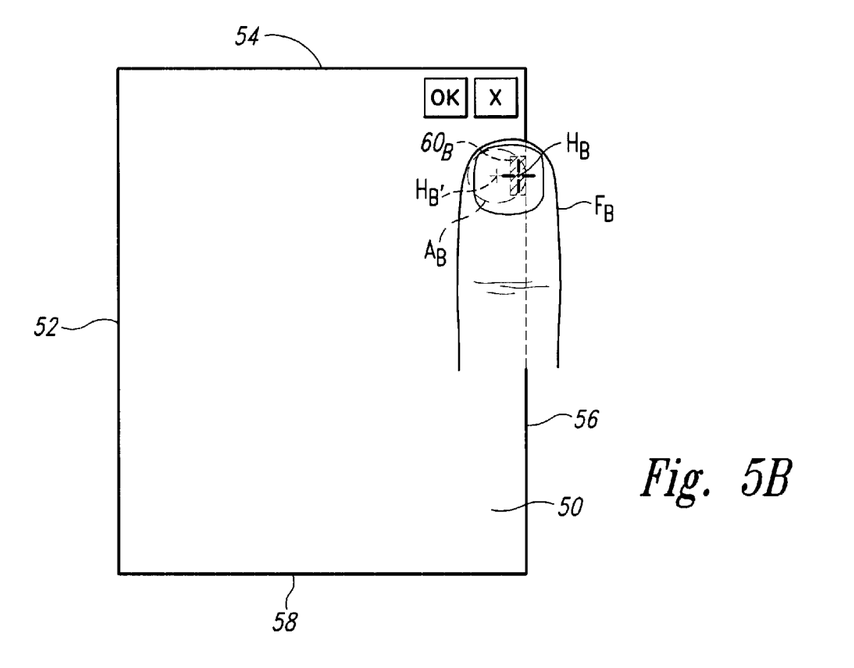

The embodiment shown in FIGS. 5A–5F differs from the prior art touch screen 12 in the manner in which the hot spot H is determined when the area of contact A is adjacent an edge of the screen 50. With reference to FIG. 5B, a finger $F_B$ is shown attempting to select an icon $60_B$ by placing the finger $F_B$ adjacent the right edge 56 of the screen 50 in contact with the screen 50 over an area $A_B$. Using the conventional approach, the computer would calculate the position of a hot spot $H_B$, at the center of the area of contact $A_B$, which would fail to select the icon $60_B$. In accordance with one embodiment of the invention, the computer calculates a hot spot $H_B$ that is offset toward the edge 56 of the screen whenever the area of contact $A_B$ is near the edge 56. As a result, the hot spot $H_B$ is substantially centered beneath the finger $F_B$ rather than centered in the area of contact $A_B$. The finger $F_B$ is thus able to select the icon $60_B$ even though the icon $60_B$ is positioned along an edge of the screen 50.

Figure 5C:
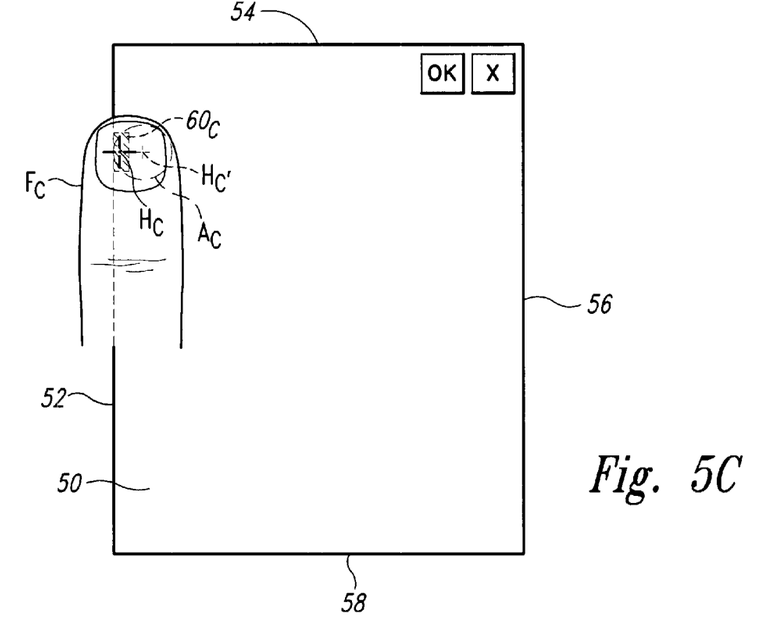
Figure 5D:
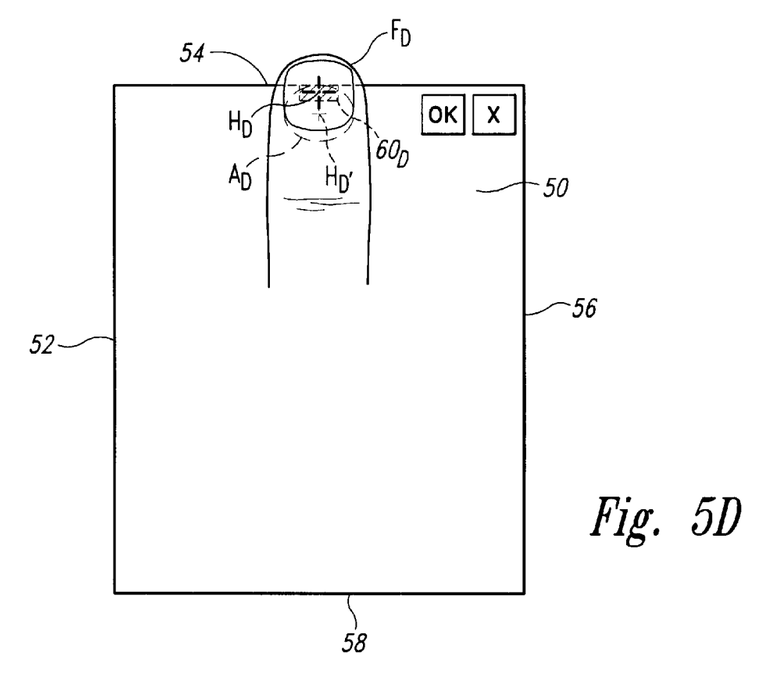
Figure 5E:
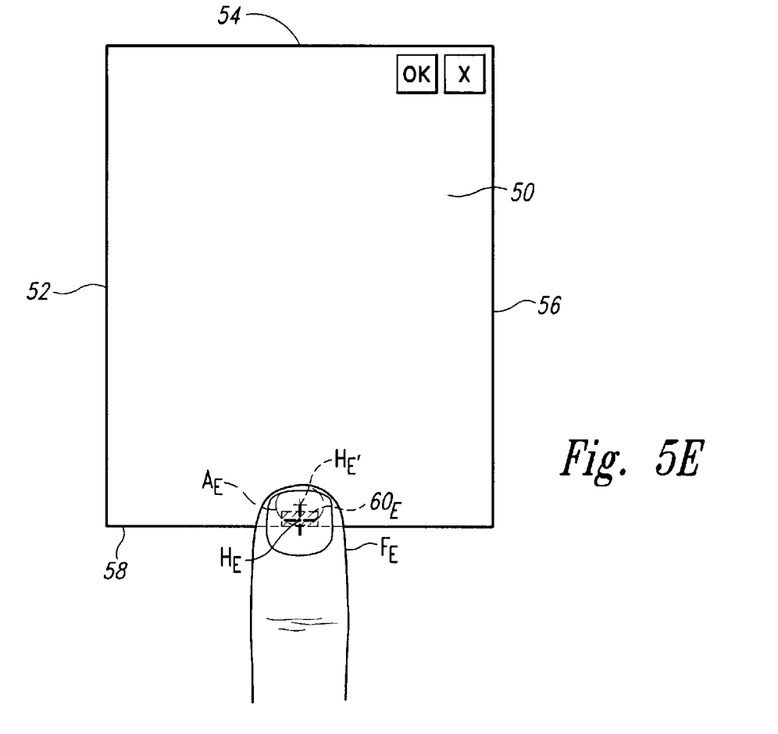

In a similar manner, and as shown in FIGS. 5C, 5D, and 5E, the computer calculates hot spots $H_C$, $H_D$, and $H_E$ that are offset toward the respective edges 52, 54, and 58 of the screen 50 whenever the respective areas of contact $A_C$, $A_D$, and $A_E$ are near the edges 52, 54, and 58. As a result, respective icons $60_C$, $60_D$, and $60_E$ can be selected by centering the finger $F_C$, $F_D$, and $F_E$ over the respective icons $60_C$, $60_D$, and $60_E$ even though the respective areas of contact $A_C$, $A_D$, and $A_E$ are not centered over the icons $60_C$, $60_D$, and $60_E$.

Figure 5F:
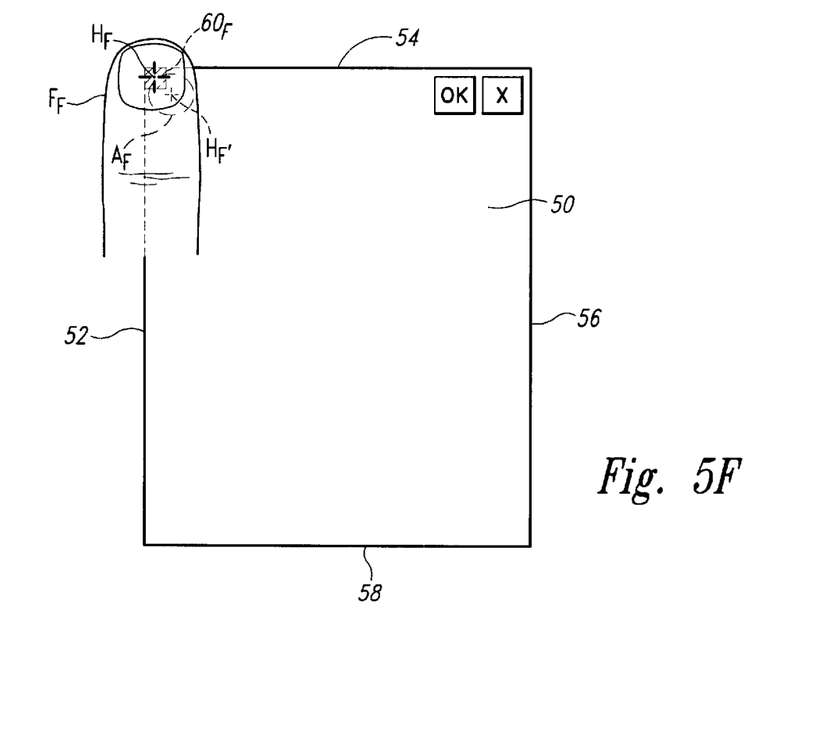

When the icon to be selected is positioned at one corner of the screen 50, the computer treats the finger F as being sufficient close to two adjacent edges of the screen 50, and alters the calculation of the hot spot H. The calculation is similar to the calculation described above, but includes adjustments toward two edges. As shown in FIG. 5F, a finger $F_F$ is attempting to select an icon $60_F$ at the upper left corner of the screen 50 at the intersection of the edges 52 and 54. The area of contact $A_F$ between the finger $F_F$ and the screen 50 is also positioned in the corner, but its center does not overlie the icon $60_F$. As a result, the finger $F_F$ would fail to select the icon $60_F$ using the conventional approach of calculating the location of the hot spot at the center of the area of contact $A_F$. The conventional hot spot is designated $H_F'$ in FIG. 5F. Instead, in accordance with one embodiment of the invention, the hot spot $H_F$ is offset from the center of the area $A_F$ toward the edge 54 because the area $A_F$ is close to the edge 54, and it is also offset from the center of the area $A_F$ toward the edge 52 because the area $A_F$ is close to the edge 52.

The finger $F_F$ is thus able to select the icon $60_F$ by centering the finger $F_F$ over icon $60_F$ even though the area of contact $A_F$ is not centered over the icon $60_F$ and even though the icon $60_F$ is located in the corner of the display 50.

Figure 6:
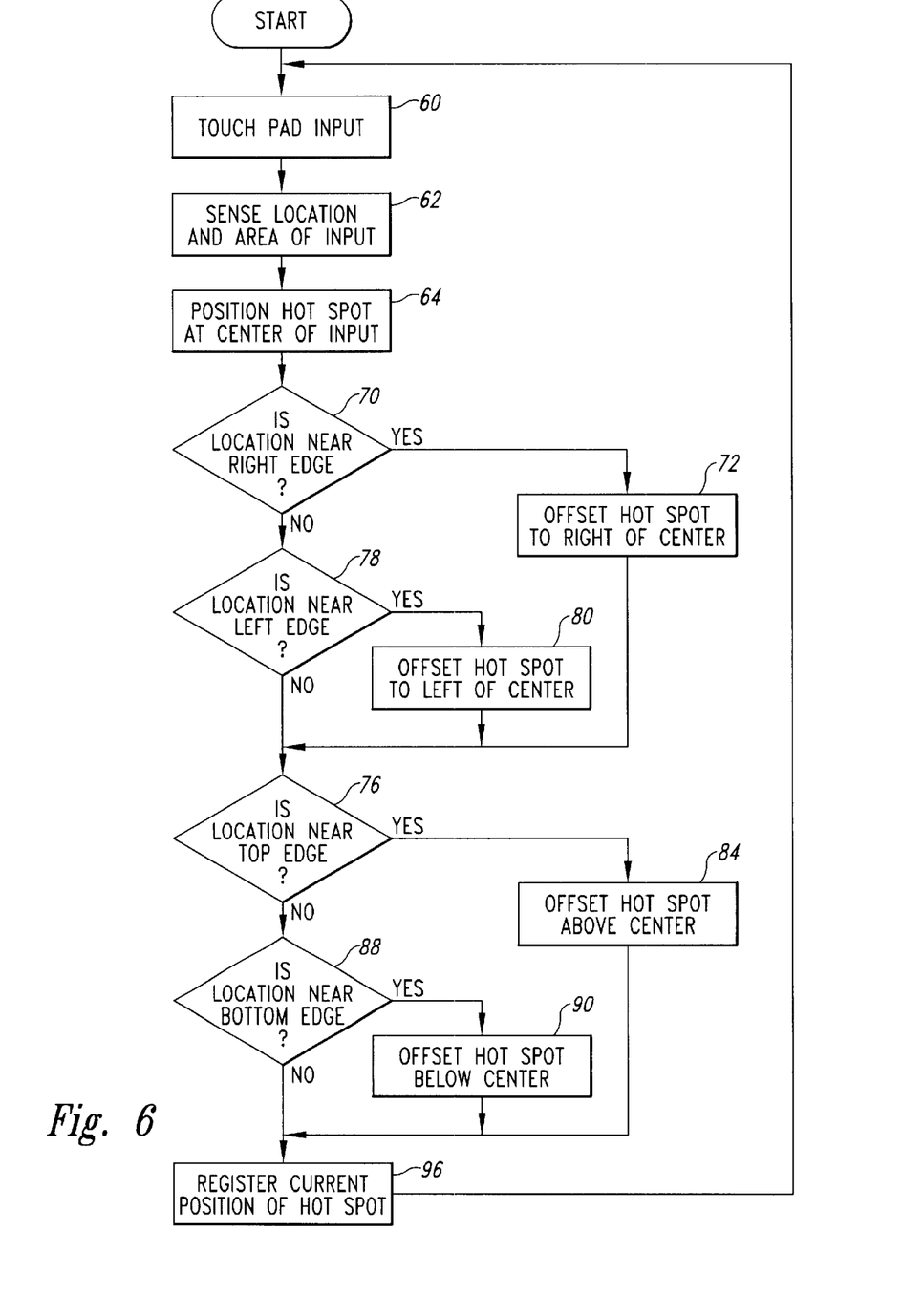
FIG. 6 is a flow chart of a software program for controlling the operation of the palmtop computer of FIG. 1 in accordance with the embodiment of the invention shown in FIGS. 5A–5F.

A software program that may be executed by the microprocessor 20 (FIG. 2) to determine the location of the hot spot H in accordance with the embodiment of FIGS. 5A–5F is shown in FIG. 6. The program is preferably stored in the ROM 32 and transferred to the system memory 26 at power on so that it can be executed out of the system memory 26.

The ROM 32 also contains a large amount of other operating system and applications software that will not be explained herein because it is somewhat peripheral to the embodiment of FIGS. 5A–5F.

As shown in FIG. 6, the program is entered at step 60 in which the existence of a touch pad input is detected. The computer then senses the location and area of the touch pad input at 62. In embodiments of the invention, a stylus as well as an operator's finger may be used to provide touchpad input. By reading the amount of area of the touch pad input and comparing that area to known amount of area, it may be determined whether a stylus or an operator's finger is being used to input data. If an operator's finger is being used, offset processing as illustrated in FIGS. 5B–5F may be accomplished. If a stylus is being used, offset processing is not needed. Processing may nonetheless be accomplished in at least two ways. First, the offsets of the routine may be made proportional to the area of the touch pad input. Because a stylus has a very small area, a proportionally small offset would result. A small offset would enable use of a stylus without potentially distracting jumps near screen edges. Second, the offset routines might simply be bypassed if the area of touch pad input is less then a given area. Continuing with FIG. 6, the position of the hot spot H is calculated at the center of the area of contact at 64 in a conventional manner as described above with reference to FIGS. 3 and 4.

After the customary position of the hot spot is calculated in step 64, a determination is made at 70 whether the area of contact, or alternatively, the calculated position of the hot spot, is near the right edge 56 of the screen 50 as shown in FIG. 5B. The particular location constituting "near the right edge", or "near" any of the other edges, can be determined empirically, and it might even be user selected so that it could be varied depending on such factors a finger size and user preference. If the hot spot H is determined at 70 to be near the right edge 56, the computer offsets the hot spot H to the right of the center of the area of contact A between the finger F and the screen 50 at 72. Offsetting the hot spot H to the right offsets it toward the right edge 56, as explained above with reference to FIG. 5B. The program then proceeds to decision 76, which will be described below.

If a determination is made at 70 that the hot spot H is not near the right edge 56, a determination is made at 78 whether the area of contact, or alternatively, the calculated position of the hot spot, is near the left edge 52 of the screen 50 as shown in FIG. 5C. If the hot spot H is determined at 78 to be near the left edge 52, the computer offsets the hot spot H to the left of the center of the area of contact A between the finger F and the screen 50 at 80. Offsetting the hot spot H to the left offsets it toward the left edge 52, as explained above with reference to FIG. 5C. After offsetting the hot spot at 80, the program proceeds to decision 76, as it does if a determination is made at 78 that the hot spot H is not near the left edge 52.

The forgoing portion of the program of FIG. 6 deals with the area of contact A being near the left edge 52 or the right edge 56. The remainder of the program of FIG. 6 deals with the situation in which the area of contact A is alternatively or additionally near the top edge 54, the bottom edge 58, or a corner as shown in FIGS. 5D, 5E, and 5F. At decision 76, a determination is made whether the area of contact, or alternatively, the calculated position of the hot spot, is near the top edge 54 of the screen 50 as shown in FIG. 5D. If the hot spot H is determined at 76 to be near the top edge 54, the computer offsets the hot spot H at 84 above of the center of the area of contact A between the finger F and the screen 50, i.e., toward the top edge 54. If the hot spot H is determined at 76 to be not near the top edge 54, the program determines at 88 if the area of contact, or alternatively, the calculated position of the hot spot, is near the bottom edge 58 of the screen 50, as shown in FIG. 5E. If the hot spot H is determined at 88 to be near the bottom edge 58, the computer offsets the hot spot H in step 90 below the center of the area of contact A between the finger F and the screen 50, i.e., toward the bottom edge 58. After offsetting the hot spot at 84, the program proceeds to 96, as it does if a determination is made at 88 that the hot spot H is not near the bottom edge 58.

As mentioned above, if the determination is made at 70 or 78 and at 76 or 88 that the position of the hot spot initially calculated at 64 is sufficiently near an edge, the initially calculated hot spot must then be in a corner of the display 50 as shown in FIG. 5F. Thus, as explained above with reference to FIG. 5F, the initially calculated hot spot is offset both horizontally and vertically.

After the location of the hot spot is determined as explained above, the current position of the hot spot H is registered at 96. The computer then selects a program or other function in the same manner that it would have if it had used the position of the hot spot initially calculated at 60.

Figure 7:
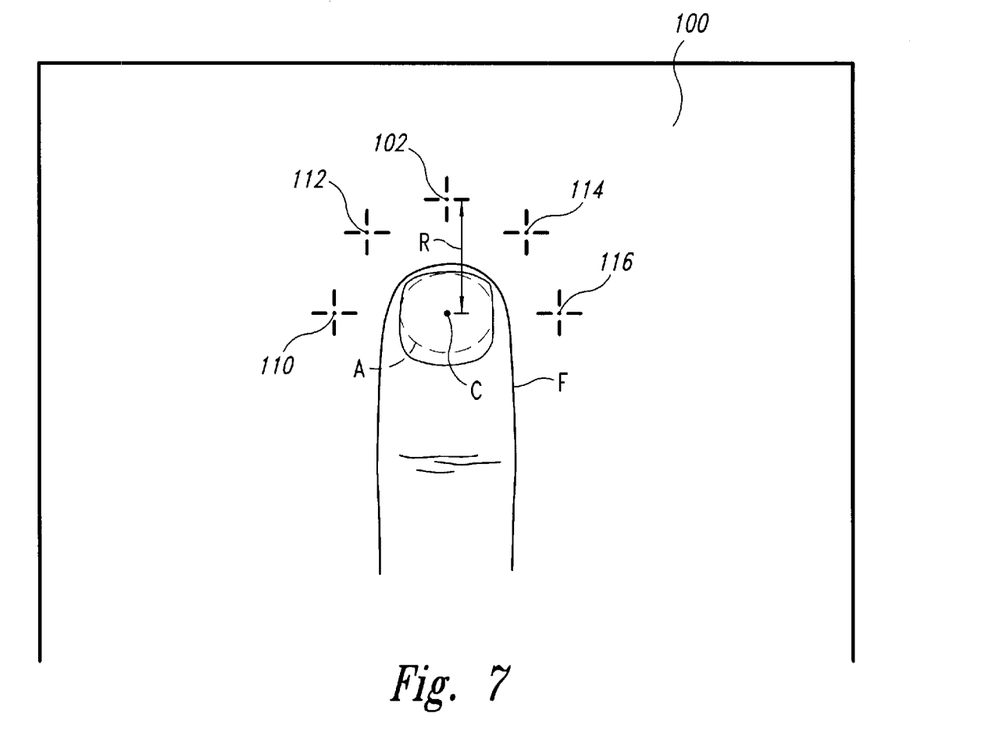
FIG. 7 is a schematic drawing illustrating the operation of the palmtop computer of FIG. 1 in accordance with another embodiment of the invention.

The operation of another embodiment of an improved computer touch screen according to the invention is illustrated in FIG. 7. As shown in FIG. 7, a finger F is placed on a touch screen 100 so that it contacts the screen 100 over an area A. In one embodiment a computer, similar to the palmtop computer of FIG. 1, generates a cursor 102 directly above the area A at an offset distance R from its center C. The magnitude of the offset distance R is selected so that the cursor is positioned above the finger F and is thus visible to the user. Although the cursor 102 is shown as a cross, it will be understood that other varieties of cursors may be used, such as a pointer or a pointing hand.

In operation, a program or other function (not shown in FIG. 3) is selected by placing the cursor 102 above an icon or other feature corresponding to the program or function. The user then takes some action to validate the selection, such as by tapping the screen 100 or pressing a key 14.

In other embodiments, also illustrated in FIG. 7, cursors 110, 114, and 116 are positioned at other locations about the area of contact A and at a sufficient distance that they are not covered by the finger F.

The embodiment illustrated in FIG. 7 would initially appear to solve many of the problems incurred in using prior art computer touch screens as explained above with reference to FIG. 4. However, on further reflection it apparently suffers from some of the same problems as the prior art touch screens. More specifically, the cursor 102 shown in FIG. 7 would appear to be incapable of selecting an icon or other feature positioned near the side or bottom edges of the touch screen 100 because the Finger F would then have to be off the screen 100. Similar problems would appear to exist in using any of the other cursors 110, 112, 114, and 116 shown in FIG. 7. For example, using the cursor 110 would appear to make it impossible to select an icon or other feature that is adjacent the top or right edges of the screen 100. To solve this apparent problem, the position of the cursor is altered when the area of contact A is near the edges of the screen, as explained below with reference to FIGS. 8A–8E.

Figure 8A:
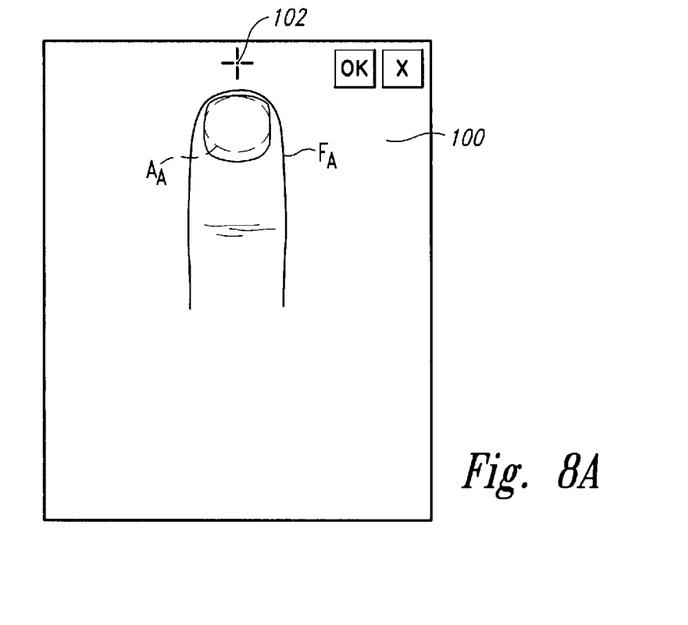
FIGS. 8A–8E are schematic drawings illustrating the operation of the palmtop computer of FIG. 1 in accordance with the embodiment of FIG. 7.

With reference to FIG. 8A, the cursor 102 is normally positioned above an area of contact $A_A$ of a finger $F_A$ as shown in FIGS. 7 and 8A. However, it will be understood that the cursor may alternatively be positioned at other locations relative to the area A of contact, such as the positions of the cursors 110, 112, 114, and 116 shown in FIG. 7.

Figure 8B:
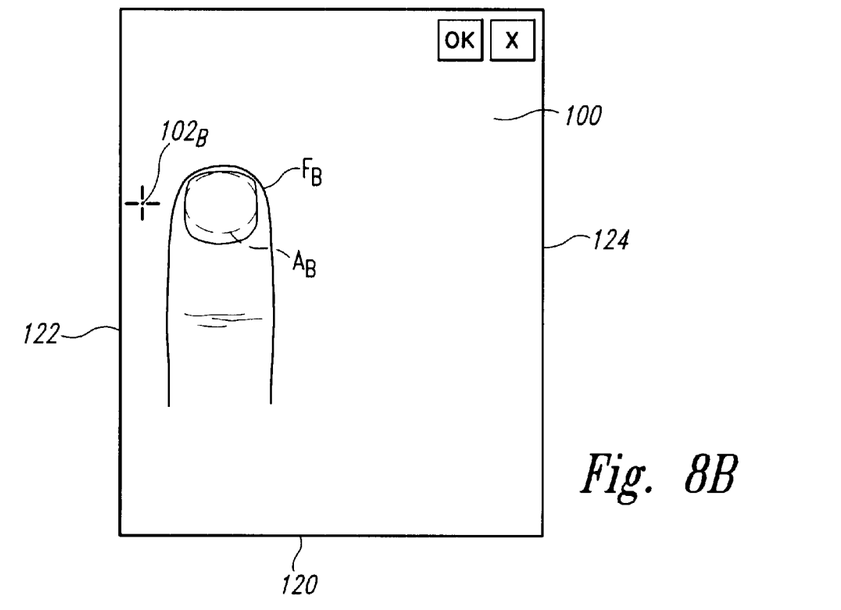
Figure 8C:
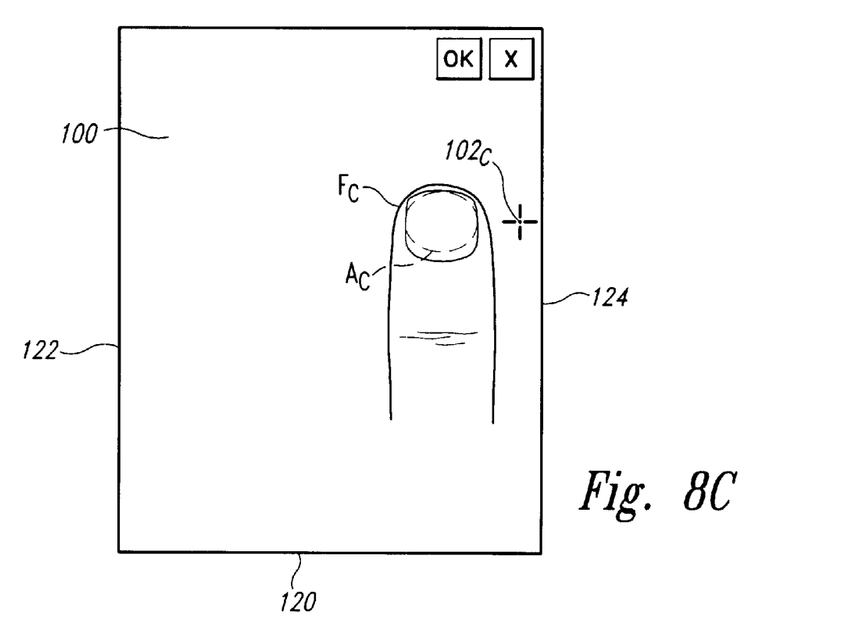

With reference to FIGS. 8B and 8C, when the area of contact $A_B$ and $A_C$, respectively, approaches within a first distance of either the left edge of the touch screen 102 or the right edge of the touch screen, the cursor $102_B$ or $102_C$ is offset to the left or right side of the Finger $F_B$ or $F_C$, respectively. If the center of the area of contact between the finger and the screen 100 is to the left of the center of the screen 100, as shown in FIG. 8B, the cursor $102_B$ moves to the left of the area of contact $A_B$. In this position, the cursor $102_B$ can select icons and other features that are positioned adjacent a left edge 122 of the screen 102. If the center of the area of contact between the finger and the screen 100 is to the right of the center of the screen 100, as shown in FIG. 8C, the cursor $102_C$ moves to the right of the area of contact $A_C$. In this position, the cursor $102_C$ can select icons and other features that are positioned adjacent a right edge 124 of the screen 102. However, when the cursors $102_B$ and $102_C$ are positioned as explained above, they cannot select an icon or other feature on the screen 100 that is on or near the center of the screen 100 within the first distance of the bottom edge 120. This limitation is the result of the cursor jumping to the right side of the finger F as soon as the area of contact $A_B$ crosses the center of the screen 100 from left to right, and the cursor jumping to the left side of the finger F as soon as the area of contact $A_C$ crosses the center of the screen 100 from right to left. This problem is solved by providing the movement of the cursor 100 with hysteresis so that the cursor $102_B$ does not move to the right side of the finger $F_B$ until the cursor $102_B$, rather than the area of contact $A_B$, has crossed from the left side to the right side of the screen 100. Similarly, the cursor $102_C$ does not move to the left side of the finger $F_C$ until the cursor $102_C$, rather than the area of contact $A_C$, has crossed from the right side to the left side of the screen 100.

Figure 8D:
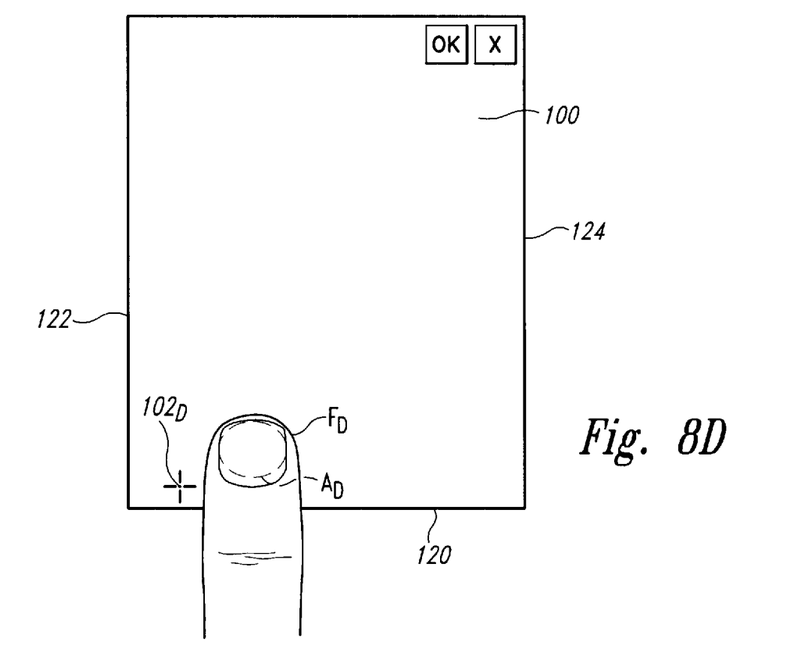
Figure 8E:
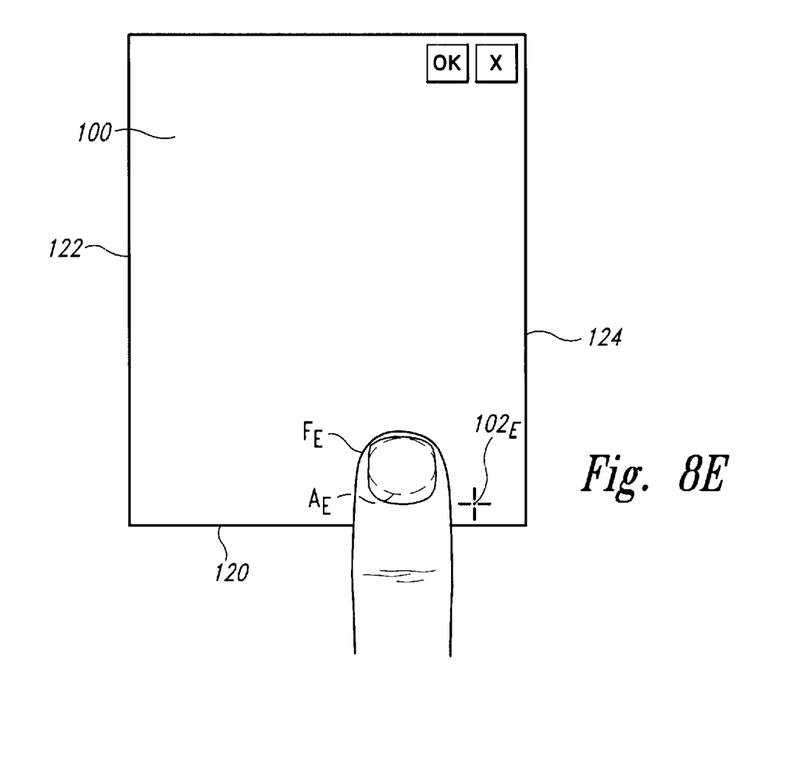

With reference to FIGS. 8D and 8E, when the area of contact $A_D$ and $A_E$, respectively, approaches within a first distance of the bottom edge 120 of the touch screen 100, the cursor $102_D$ or $102_E$ is not only offset to one side of the Finger, as explained above, but it is also offset downwardly. Thus, when the area of contact $A_D$ is on the left side of the screen as shown in FIG. 8D, the cursor $102_D$ is offset downwardly to the left of the area of contact $A_D$. In this position, the cursor $102_D$ can select icons and other features that are positioned adjacent the left half of the bottom edge 120 of the screen 100. If the center of the area of contact between the finger and the screen 100 is to the right of the center of the screen 100, as shown in FIG. 8E, the cursor $102_E$ is offset downwardly to the right of the area of contact $A_E$. In this position, the cursor $102_E$ can select icons and other features that are positioned adjacent the right half of the bottom edge 120 of the screen 102. As explained above, in the event the area of contact $A_D$ is moved from the left side to the right side of the screen 100, hysteresis is provided so that the cursor $102_D$ does not move to the right side of the finger F until the cursor $102_D$ has crossed over to the right side of the screen 100. Similarly, in the event the area of contact $A_E$ is moved from the right side to the left side of the screen 100, the cursor $102_E$ does not move to the left side of the finger F until the cursor $102_E$ has crossed over to the left side of the screen 100.

Figure 9A:
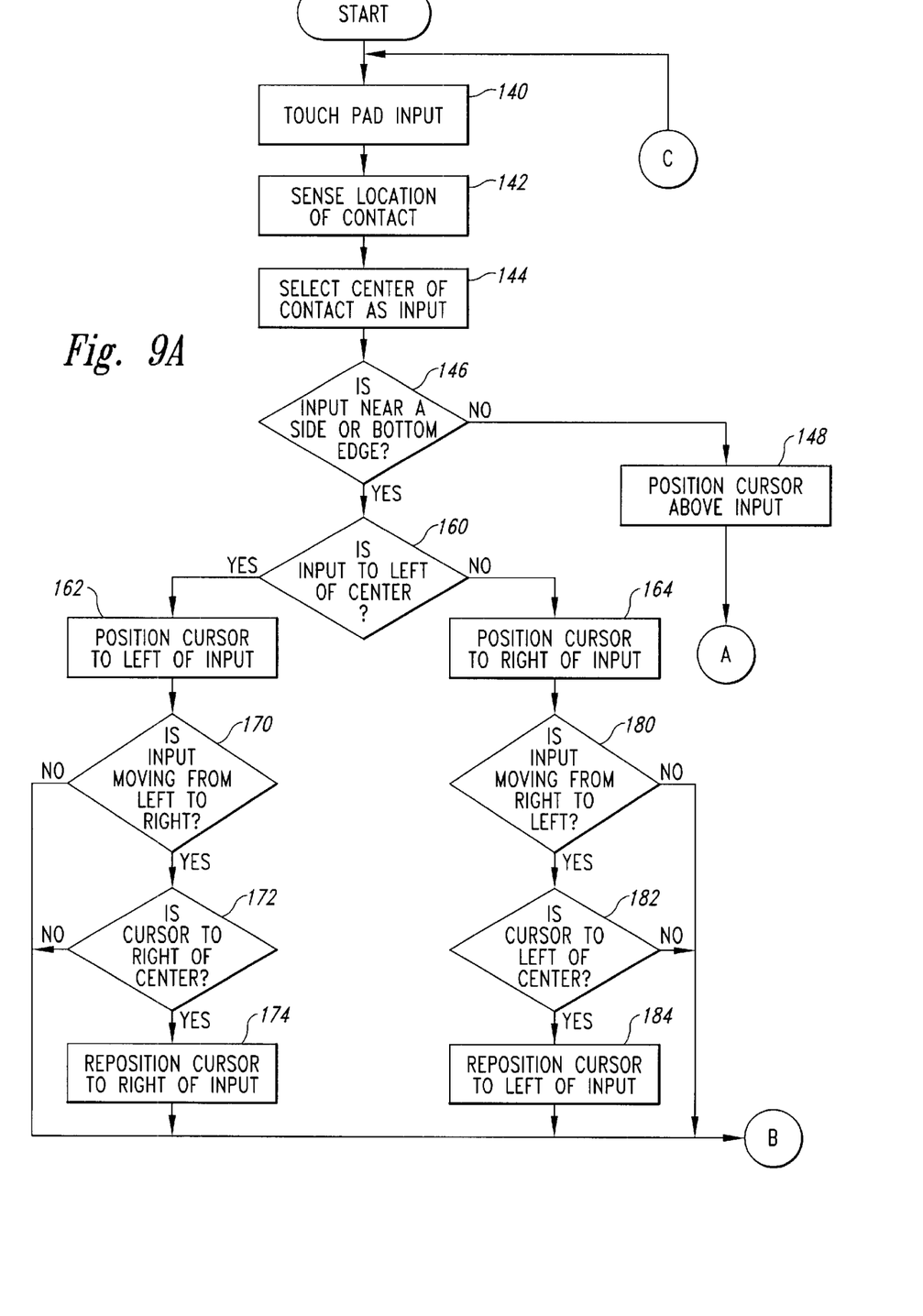
FIGS. 9A and 9B are flow charts of a software program for controlling the operation of the palmtop computer of FIG. 1 in accordance with the embodiment of the invention shown in FIGS. 8A–8E.
Figure 9B:
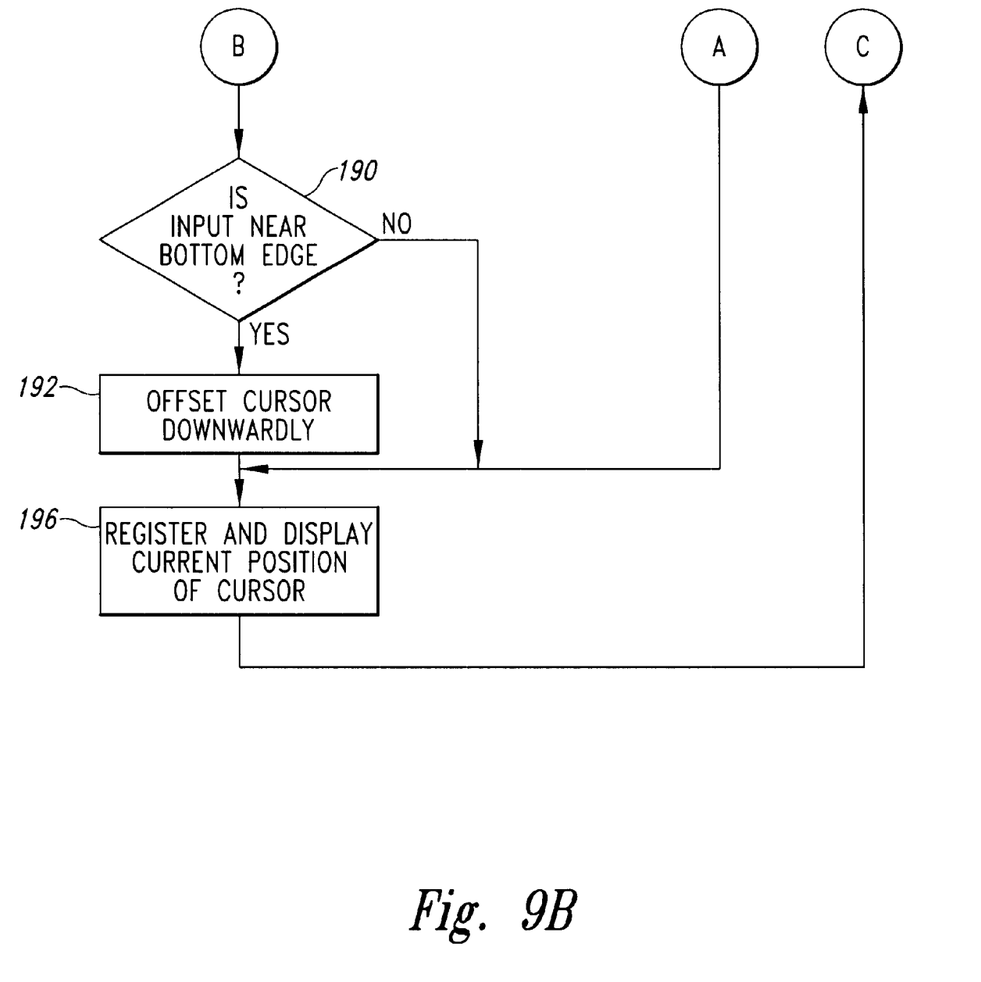

A software program that may be executed by a microprocessor to control the position of the cursor 102 as shown in FIGS. 8A–8E is shown in FIG. 9. As with the program of FIG. 6, the program of FIG. 9 is preferably stored in the ROM 32, as shown in FIG. 2, and transferred to the system memory 26 at power on so that it can be executed out of the system memory 26.

The program of FIG. 9 is entered at step 140 in which the existence of a touch pad input is detected. The computer then senses the location and area of the touch pad contact at 142. The center of the area of contact is then determined at 144 and is considered the "input" selected by the user. A determination is then made at 146 whether the input is near either the left edge 122, the right edge 124, or the bottom edge 120 of the screen 100, i.e., within the distance from the edges shown in FIGS. 8B–8E. As in the embodiment of FIGS. 5 and 6, the particular distance constituting "near the edge" can be determined empirically, and it may even be user selected. If a determination is made at 146 that the input is not near the right, left, or bottom edges, the cursor is positioned above the input at 148, as shown in FIG. 8A. In such case, most of the remaining portion of the flow chart of FIG. 9 is skipped because it is not necessary to alter the position of the cursor, as explained above with reference to FIGS. 8A–8E.

If a determination is made at 146 that the input is near the left edge 122, the right edge 124, or the bottom edge 120, a decision is made at 160 whether the input is to the left of the center of the screen 100. The determination is necessary because, as mentioned above with reference to FIGS. 8B and 8C, the cursor is generally positioned to the left of the input if the input is close to an edge other than the top edge and on the left side of the screen, and the cursor is generally positioned to the right of the input if the input is close to an edge other than the top edge and on the right side of the screen. Accordingly, if a determination is made at 160 that the input is to the left of the center of the screen 100, the cursor is positioned to the left of the input at 162. Otherwise, the cursor is positioned to the right of the input at 164.

Regardless of whether the cursor is positioned to the right or left of the input, a determination must be made whether the input is moving from one side to the other so that hysteresis can be provided, as explained above. Assuming that it was determined at 160 that the input is to the left of center, a determination is made at 170 whether the input is moving from left to right. This determination can be made by examining the position previously determined at 144 and comparing to the present position determination at 144. If the input is not moving to the right, the cursor remains to the left of the input as shown in FIG. 8B. If it is determined at 170 that the input is moving to the right, a determination is made at 172 whether the cursor is to the right of the center of the screen 100. If not, the cursor remains to the left of the input. However, when the cursor has moved to the right a predetermined distance beyond the center of the screen 100, the cursor is repositioned at 174 to the right of the input. Repositioning of the cursor occurs the predetermined distance beyond the center, rather than at the center, so that objects located at the center of the screen can be selected.

In a similar manner, if it was determined at 160 that the input is not to the left of center of the screen 100, after the cursor is positioned to the right of the input at 164, a determination is made at 180 whether the input is moving from right to left. If the input is not moving to the left, the cursor remains to the right of the input as shown in FIG. 8C. If it is determined at 180 that the input is moving to the left, a determination is made at 182 whether the cursor is to the left of the center of the screen 100. If not, the cursor remains to the right of the input. However, when the cursor has moved to the left beyond the center of the screen, the cursor is repositioned at 184 to the left of the input.

Regardless of whether the cursor has been positioned to the right of left of the input, a determination is made at 190 whether the input is near the bottom edge 120, i.e., within the distance to the edge shown in FIGS. 8D and 8E. If it is determined at 190 that the input is near the bottom edge, the cursor must be offset downwardly so that icons and other features adjacent the bottom edge can be selected, as explained above with reference to FIGS. 8D and 8E. Accordingly the previously determined position of the cursor, i.e., to the right or left of the input, is offset downwardly at 192. If it is determined at 190 that the input is not near the bottom edge, the cursor remains in its position by bypassing the offset 192.

At this point, the position of the cursor has been finally set. The current position of the cursor is then displayed and registered as the user input, i.e., the hot spot, at 196 before returning to 140 to await another touch screen input. The hot spot registered at 196 is used by a computer similar to the computer 10 shown in FIG. 1 in the same manner that user inputs conventionally entered are used to select a program or function.

Figure 10:
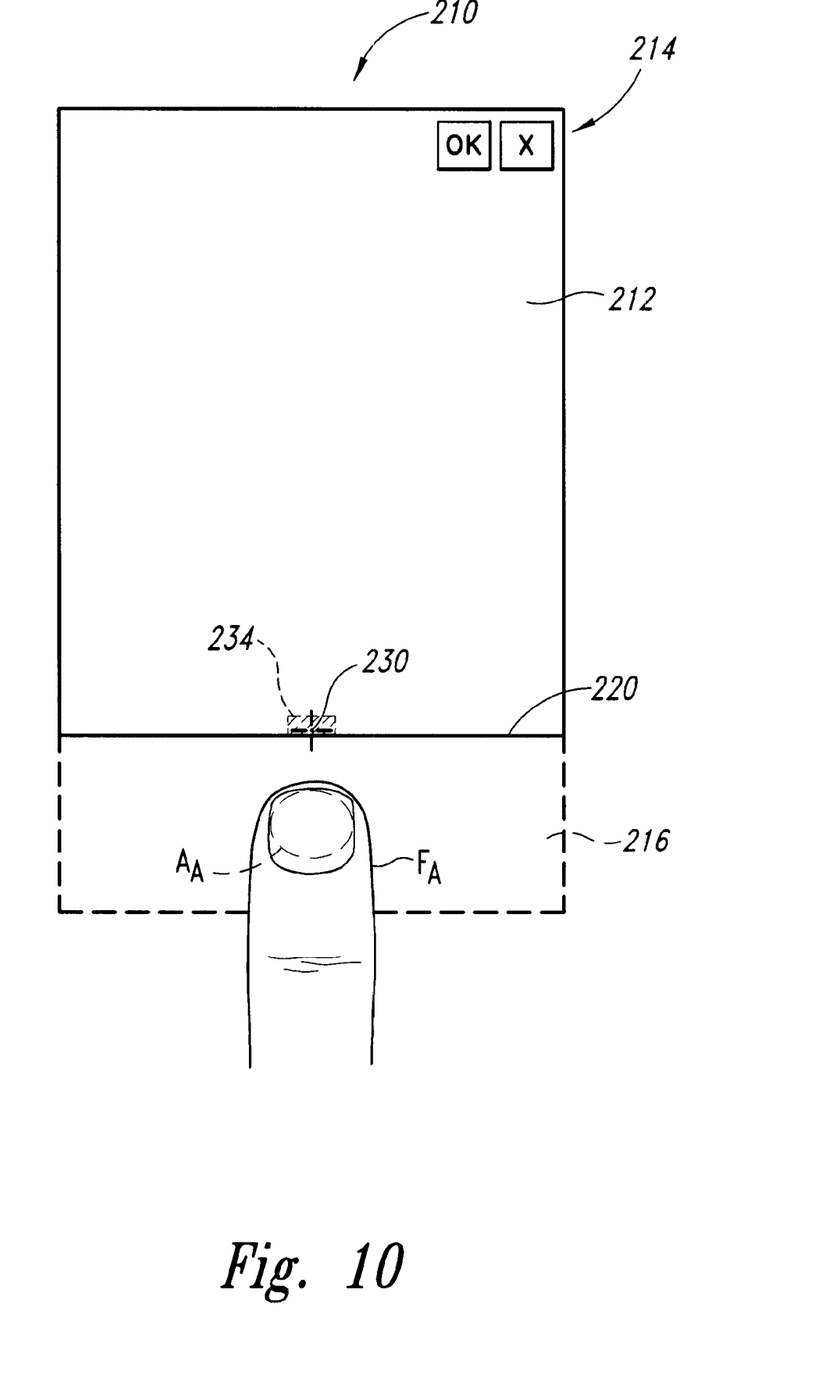
FIG. 10 is a schematic drawing illustrating the operation of an improved palmtop computer to register a user input adjacent a bottom edge of the computer's display screen in accordance with one embodiment of the invention.

Still another embodiment of a computer touch screen 210 is illustrated in FIG. 10. The touch screen 210 includes a touch sensitive display area 212 on which images, such as icons 214, may be displayed, and a touch sensitive area 216 on which images may not be displayed. The embodiment of FIG. 10 operates in the same manner as the embodiment of FIGS. 7–9 over the entire area of the display area 212 except near a bottom edge 220 of the display area 212. Unlike the embodiment of FIGS. 7–9, images positioned on the screen 210 near the bottom edge 220 of the display area 212 are selected in the same manner as images at other locations of the screen. More specifically, a hot spot 230 is offset upwardly from a contact area $A_A$ of a finger $F_A$ with the touch sensitive area 216 of the screen 210 in the same manner that the hot spot is offset when the contact area $A_A$ is on the display area 212. Therefore, an icon 234 adjacent the bottom edge 220 of the display area 212 may be selected as shown in FIG. 10 by positioning the contact area $A_A$ so that the hot spot 230 overlies the icon 234.

The software program controlling the operation of the touch screen 210 is essentially the same as the software program explained above with reference to FIG. 9, with appropriate modifications that are relatively minor and will be apparent to one skilled in the art.

From the foregoing it will be appreciated that, although specific embodiments of the invention have been described herein for purposes of illustration, various modifications may be made without deviating from the spirit and scope of the invention. For example, although the embodiments of the invention have been described as having hot spots or a cursor that jumps from one discrete location to another, it will be understood that the hot spots or cursor may smoothly transition between various location relative to the area of contact depending upon the locations of the area of contact on the touch screen. Accordingly, the invention is not limited except as by the appended claims.

What is claimed is:

1. In a computer system having a microprocessor and a touch screen in which a user contacts the screen over a contact area, a program storage medium storing a software program that, when executed by the microprocessor, causes the touch screen to perform the acts comprising:

determining a position of the contact area on the touch screen;

if the contact area is spaced apart from edges of the touch screen by more than a predetermined distance, registering a user input at a first position within the area of contact; and if the contact area is within the predetermined distance of an edge of the touch screen, registering a user input at a position within the area of contact that is offset from the first position toward an edge that is closest to the area of contact.

2. The program storage medium of claim 1 wherein the first position comprises the center of the area of contact.

3. In a computer system having a microprocessor and a touch screen in which the user contacts the screen over a contact area, a program storage medium storing a software program that, when executed by the microprocessor, causes the touch screen to perform the acts comprising:

determining a position of the contact area on the touch screen;

if the contact area is spaced apart from left and right edges of the touch screen by more than respective first and second predetermined distances, displaying a cursor on the screen at a position offset from the contact area toward a top edge of touch screen;

if the contact area is within the first predetermined distance of the left edge of the touch screen, displaying a cursor on the screen at a position offset from the contact area toward the left edge of touch screen; and if the contact area is within the second predetermined distance of the right edge of the touch screen, displaying a cursor on the screen at a position offset from the contact area toward the right edge of touch screen.

4. The program storage medium of claim 3 wherein the software program stored in the program storage medium, when executed by the microprocessor, further causes the touch screen to perform the acts comprising:

if the contact area is within a third predetermined distance of a bottom edge of the touch screen, displaying a cursor on the screen at a position offset from the contact area toward the bottom edge and one of the right or left edges of the touch screen; and registering the position of the displayed cursor as a user input.

5. The program storage medium of claim 4 wherein the first, second, and third predetermined distances are equal to each other.

6. The program storage medium of claim 3 wherein the act of displaying a cursor on the screen at a position offset from the contact area toward one of the right or left edges of the touch screen comprises:

if the contact area is on the left hand side of the touch screen, displaying a cursor on the screen at a position offset from the contact area to the left and toward a bottom edge of the touch screen; and if the contact area is on the right hand side of the touch screen, displaying a cursor on the screen at a position offset from the contact area to the right and toward a bottom edge of the touch screen.

7. The program storage medium of claim 3 wherein:

the act of displaying a cursor on the screen at a position offset from the contact area toward the left edge of touch screen comprises displaying a cursor on the screen at a position offset from the contact area toward the left edge of touch screen only if the contact area is within the first predetermined distance of the left edge of the touch screen and the contact area is not moving to the right past a location where the cursor would be on the right side of the touch screen, and the act of displaying a cursor on the screen at a position offset from the contact area toward the right edge of touch screen comprises displaying a cursor on the screen at a position offset from the contact area toward the right edge of touch screen only if the contact area is within the second predetermined distance of the right edge of the touch screen and the contact area is not moving to the left past a location where the cursor would be on the left side of the touch screen.

8. The program storage medium of claim 3 wherein the touch screen comprises a touch sensitive display area and a display incapable touch sensitive area, and wherein the software program stored in the program storage medium, when executed by the microprocessor, further causes the touch screen to display the cursor on the display area of the screen adjacent the touch sensitive area by positioning the contact area on the touch sensitive area adjacent the display area.

* * * * *